Patented July 15, 1952

2,603,572

UNITED STATES PATENT OFFICE 2,603,572

LINOLEUM BINDING COMPOSITION

Frank G. Oswald, Wilmington, Del., assignor to Hercules Powder Company, Wilmington, Del., a corporation of Delaware No Drawing. Application May 14, 1949, Serial No. 93,427

6 Claims. (Cl. 106—222)

This invention relates to a linoleum cement composition and in particular to a fast curing linoleum cement.

In the preparation of linoleum, it is usual to prepare a tough binding composition which optionally is mixed with a filler or the like and formed into a linoleum sheet. According to the usual procedure, there is prepared the binding agent, known in the art as a linoleum cement, which generally consists of a siccative oil-resin composition, optionally together with suitable and desired modifiers. As the oil, there is employed any of the well known thickened drying or semi-drying oils such as, for example, raw, blown, bodied or modified soybean oil, linseed oil, or the like, raw, blown, bodied or dehydrated castor oil, or the like, and in combination with this oil a resin, for example, a natural or synthetic resin such as alkyd resins, phenol aldehyde resins, rosin and modified rosins, ester gums, and other natural and synthetic resins which are readily available.

According to the conventional procedure, the siccative oil may be prepared or treated, for example, by the appropriate process such as mild oxidation or the like until a desired consistency is obtained after which the resin is blended therewith and the composition mixed or milled, optionally together with fillers, pigments, and the like, and the composition is then calendered. In such prior procedures, a relatively long curing operation is required, for example, after the calendering step, a curing period generally extending for a period of about three weeks at the end of which time a hard-wearing, rugged surface covering composition results.

Now in accordance with the present invention, there is prepared a novel linoleum cement composition comprising binding materials such as a siccative oil-resin blend, now modified with an alkylated hydroxyalkyl cellulose, said composition being characterized by a significantly shortened curing period. A highly satisfactory composition may be prepared by blending together a siccative oil and a resin compatible with organosoluble cellulose ethers and, during the mixing or milling thereof, adding to the composition an alkylated hydroxyalkyl cellulose ether such as, for example, an ethylated hydroxyethyl cellulose, after which there may be incorporated fillers, pigments and further additives as desired and the mixture calendered to the required thickness and cured in a significantly shorter time than is required for the composition not containing the cellulose ether.

The general nature of the invention having been set forth, the following examples are presented in illustration but not in limitation of the scope thereof.

Example 1

A mixture was prepared of 3080 parts of linseed oil and 15.4 parts litharge, and a stream of air was passed through the mixture with mechanical agitation for 3 hours at 220° F. and until the siccative oil reached a consistency where the oil had gelled sufficiently to cling to the agitator. At the end of this time, there was added to the composition 920 parts of a molten polyhydroxy alcohol ester of a polymerized rosin supplied under the trade name Poly-pale Ester No. 1 (by the Hercules Powder Company) and the stream of air was continued therethrough for an additional 25 minutes and the consistency of the mixture was such that a tough gel is obtained which no longer clings to the agitator. At this time, there was then added to the mixture ethylated hydroxyethyl cellulose in an amount equal to 10% of the total resulting mixture, the ethylated hydroxyethyl cellulose being added by blending at temperatures of 250 to 270° F. In this blending operation, the ethylated hydroxyethyl cellulose was first milled on a two-roll mill until it was softened and the siccative oil-resin blend was added to the mill in small portions over a period of a few minutes. The resulting composition was milled for 10 minutes and the rolls then were rapidly cooled, one to 220° F. and the other to a temperature as cool as could be maintained with cold water. Under these conditions and with continued milling, the desired filler and pigments were added over a 10-minute period and the composition milled for an additional 20 minutes to insure intimate mixture of the components, after which the low temperature roll was heated slightly and the material sheeted therefrom. In the preparation of this composition, there were employed 3150 parts of the siccative oil-resin mixture, 3300 parts wood flour, 2520 parts York whiting, 780 parts rutile titanium dioxide and 350 parts of an ethylated hydroxyethyl cellulose having a degree of hydroxyethyl substitution of 0.67, a degree of ethoxyl substitution of 2.58 and a solution viscosity of 63 cps. as 5% solution in a solvent consisting of 4 parts toluene per 1 part ethyl alcohol.

After the thus compounded linoleum composition stood for 25 hours at room temperature, the sheeted mixture was calendered to ⅛" thickness and cured at 170° F. At the end of 11 days, the composition showed a residual indentation of 4% when tested by the indentation recovery method set forth herein and thus was considered to be satisfactorily cured. A similar linoleum prepared under identical conditions and employing an identical formula except for the omission of the ethylated hydroxyethyl cellulose required a cure of 21 days after which it had a residual indentation slightly above 4%.

*Example 2*

The procedure of Example 1 was repeated, employing the formula of Example 1 with the exception that FF wood rosin was substituted for the Poly-pale Ester No. 1. After a curing time of 11 days, the linoleum had a residual indentation of slightly less than 4% and was considered to be cured whereas a similar composition containing no ethylated hydroxyethyl cellulose required a curing time of 21 days to reach this same degree of cure.

In the preparation of a linoleum according to a parallel procedure, the ethylated hydroxyethyl cellulose was replaced with an ethyl cellulose having a softening temperature somewhat higher than 150° C. At a milling temperature below 300° F. roll temperature, this ethyl cellulose did not soften sufficiently to permit its milling together with the siccative oil-resin composition and at a roll temperature of 320° F., when the siccative oil-resin composition was mixed therewith, the cement cured on the rolls before all the filler and pigment could be added thereto.

In determining the degree of cure possessed by a linoleum composition, and in measuring the effectiveness of the alkylated hydroxyalkyl cellulose ether in expediting the curing period, there was employed a modification of the residual indentation tests set forth and defined in Federal Specification LLL–L–359. According to the test, indentation measurements were determined on a Rockwell hardness tester equipped with a special linoleum tip having a diameter of 0.178" and a special counterweight (901.1 gms.) exerting a load of 80 pounds on the tip, thus equivalent to 3200 lb./sq. in. In employing this tester, the sample is conditioned at 77° F. and 50% relative humidity for 28 hours after which the minor load is applied on a spot of measured thickness within a 5-second period and at the end of the 5-second period, the major load is applied for 30 seconds and the load is immediately released. After 60 minutes, the residual indentation is determined as the per cent of original thickness at the test spot. For the purposes of comparative tests, a composition was considered to be satisfactorily cured when a residual indentation of about 4% is measured in this test.

The alkylated hydroxyalkyl cellulose is selected from the group of lower alkyl compounds and is chosen to give an optimum balance of properties to the linoleum product. Thus, in the examples there has been disclosed an ethylated hydroxyethyl cellulose which has been shown to impart desirable properties to the product. It will be understood, of course, that there may be employed other alkylated hydroxyalkyl compounds and, in general, where a relatively hard linoleum product is to be formed, it is preferred to employ the lower members of these alkyl classes such as, for example, methylated hydroxyalkyl celluloses, alkylated hydroxymethyl celluloses, ethylated hydroxyethyl celluloses, or similar lower members of the class. The preferred alkylated hydroxyalkyl cellulose is further characterized by having a degree of hydroxyalkyl substitution between about 0.3 and about 1.0 hydroxyalkyl group per anhydroglucose unit and a degree of alkoxy substitution of at least 2.4 alkoxy groups per anhydroglucose unit. It is presently believed and understood that a certain degree of alkylation of the hydroxyalkyl groups may occur, but it is not desired to limit this invention to the presence of such modified side chains of the cellulose molecule inasmuch as highly useful compositions may be prepared by procedures which cannot yield such modification of the side chains. General correlation of degree of substitution with properties of the resulting linoleum composition indicates that with an increasing degree of substitution such as, for example, an hydroxyethyl substitution of 0.98 and an ethoxyl substitution substantially higher than 2.5, imparts to the composition a higher flexibility and a greater softness.

Likewise, when proceeding according to this invention, it has generally been found that the increased rate of curing imparted to the composition is more pronounced with the addition of greater quantities of the alkylated hydroxyalkyl cellulose incorporated therein. For example, when about 5% alkylated hydroxyalkyl cellulose is employed, an intermediate curing period results, being somewhat less than the curing time for the unmodified cement but greater than the curing time for the composition containing about 10% ether, whereas a cement containing about 20% cellulose ether will have a significantly shorter cure. In general, it is found that for an optimum balance of properties such as flexibility, softness, curing speed and the like, it is advisable to employ an amount of the cellulose ether up to about 50%, based on the total composition, and preferably between about 5 and about 25%.

In the procedure for the preparation of the linoleum composition, it has been found, surprisingly, that a variation in the results is produced by the order of blending of the ingredients and it is now understood that a preferred method of addition of the ingredients contemplates the introduction of the alkylated hydroxyalkyl cellulose after the siccative oil has attained the desired consistency. Thus, for example, when the siccative oil is treated by blowing or the like, it is preferred to carry out the blowing operation prior to the addition of the alkylated hydroxyalkyl cellulose according to procedures known in the art, and when the alkylated hydroxyalkyl cellulose is blended with the siccative oil or siccative oil-resin composition at the desired consistency, the composition thus produced has a shortened curing time as compared with the time which may be produced without the presence of the cellulose derivative. However, it will be understood that in the blending and mixing of the components of the new linoleum composition there may be employed any of the blending and mixing procedures for devices known to the art, and that within the scope of the invention the present advantages are not limited to the use of any particular or specific procedure or equipment.

What I claim and desire to protect by Letters Patent is:

1. A binding composition comprising a blend of a resin and a siccative oil and not more than about 50% based on the total weight of the composition of an alkylated hydroxyalkyl cellulose ether having a degree of hydroxyalkyl substitution between about 0.3 and 1.0 and alkyl substitution of at least about 2.4 groups per anhydroglucose unit.

2. A binding composition comprising a blend of a resin and a siccative oil and not more than about 50% based on the total weight of the composition of an ethylated hydroxyethyl cellulose ether having a degree of hydroxyethyl substitution between about 0.3 and 1.0 and ethyl substitution of at least about 2.4 groups per anhydroglucose unit.

3. A binding composition comprising a blend of a resin and a siccative oil and between about 5 and about 25% based on the total weight of the composition of an ethylated hydroxyethyl cellulose ether having a degree of hydroxyethyl substitution between about 0.3 and 1.0 and ethyl substitution of at least about 2.4 groups per anhydroglucose unit.

4. A binding composition comprising a blend of a natural resin and a siccative oil and between about 5% and about 25% based on the total weight of the composition of an alkylated hydroxyalkyl cellulose ether having a degree of hydroxyalkyl substitution between about 0.3 and 1.0 and alkyl substitution of at least about 2.4 groups per anhydroglucose unit.

5. A binding composition comprising a blend of a rosin and a siccative oil and between about 5% and about 25% based on the total weight of the composition of an alkylated hydroxyalkyl cellulose ether, having a degree of hydroxyalkyl substitution between about 0.3 and 1.0 and alkyl substitution of at least about 2.4 groups per anhydroglucose unit.

6. A binding composition comprising a blend of a rosin and a blown linseed oil and between about 5% and about 25% based on the total weight of the composition of an ethylated hydroxyethyl cellulose ether, having a degree of hydroxyethyl substitution between about 0.3 and 1.0 and ethyl substitution of at least about 2.4 groups per anhydroglucose unit.

FRANK G. OSWALD.

REFERENCES CITED

The following references are of record in the file of this patent:

UNITED STATES PATENTS

| Number | Name | Date |
| --- | --- | --- |
| 1,877,856 | Hagedorn et al. | Sept. 30, 1932 |
| 2,388,764 | Reichel et al. | Nov. 13, 1945 |

OTHER REFERENCES

"Cellulose and Cellulose Derivatives," Emil Ott, Interscience Publishers, Inc., N. Y., 1943, pp 800 and 801.